(12) United States Patent
Bohannon et al.

(10) Patent No.: US 7,685,231 B2
(45) Date of Patent: Mar. 23, 2010

(54) MEMBER ACTIVATION

(75) Inventors: James John Bohannon, Pleasanton, CA (US); Andre Burgoyne, Berkeley, CA (US); David Rosen, Burlingame, CA (US)

(73) Assignee: Mypoints.com Inc., San Francisco, CA (US)

( * ) Notice: Subject to any disclaimer, the term of this patent is extended or adjusted under 35 U.S.C. 154(b) by 131 days.

(21) Appl. No.: 11/696,545

(22) Filed: Apr. 4, 2007

(65) Prior Publication Data

US 2008/0250148 A1    Oct. 9, 2008

(51) Int. Cl.
*G06F 15/16* (2006.01)
(52) U.S. Cl. .................. 709/203; 709/217; 709/223; 705/26
(58) Field of Classification Search .............. 709/203, 709/217, 219, 223, 224; 705/26
See application file for complete search history.

(56) References Cited

U.S. PATENT DOCUMENTS

| 6,167,435 | A  | * | 12/2000 | Druckenmiller et al. | .... 709/206 |
| 7,224,778 | B2 | * | 5/2007 | Aoki | ....... 379/88.23 |
| 2002/0147625 | A1 | * | 10/2002 | Kolke, Jr. | ....... 705/9 |
| 2008/0127318 | A1 | * | 5/2008 | Adler | ............ 726/7 |

* cited by examiner

*Primary Examiner*—Lashonda T Jacobs
(74) *Attorney, Agent, or Firm*—Marshall, Gerstein & Borun LLP (57) ABSTRACT

A method and system are herein disclosed for registering a member at a targeted web-based information management system using a reduced amount of member and system interaction to confirm and establish the member's contact information. Generally, the method may communicate permission to solicit a potential member to the information management system. In one embodiment, the member previously communicated permission to receive solicitations from other systems to another web-based information management system. The method may communicate the permission from another web-based system to the present system. The permission may include member identification and/or demographic data. The method may communicate a solicitation message from the system to the member, the solicitation message comprising at least a portion of the member identification data. The member may then communicate a confirmation message to the targeted web-based information management system, wherein the confirmation message is in reply to the solicitation message and includes the portion of the member identification data. Using the confirmation, the system may then match the portion of the member identification data from the confirmation message to the portion of the member identification data from the confirmation message.

29 Claims, 4 Drawing Sheets

MEMBER ACTIVATION

TECHNICAL FIELD

The following disclosure relates to a method for activating new membership accounts in a web-based environment.

BACKGROUND

Users of the World Wide Web distributed computing environment may freely send and retrieve data across long distances and between remote computing devices. The Web, implemented on the Internet, presents users with documents called "web pages" that may contain information as well as "hyperlinks" that allow the users to select and connect to related web sites. The web pages may be stored on remote computing devices, or servers, as hypertext-encoded files. The servers use Hyper Text Transfer Protocol (HTTP), or other protocols to transfer the encoded files to client users. Many users may remotely access the web sites stored on network-connected computing devices from a personal computer (PC) through a browser application running on the PC.

The browser application may act as an interface between user PCs and remote computing devices and may allow the user to view or access data that may reside on any remote computing device connected to the PC through the World Wide Web and browser interface. Typically, the local user PC and the remote computing device may represent a client and a server, respectively. Further, the local user PC or client may access Web data without knowing the source of the data or its physical location. Publication of Web data may be accomplished by simply assigning a Uniform Resource Locator (URL) to data that refers to the local file. To a local client, the Web may appear as a single, coherent data delivery and publishing system in which individual differences between other clients or servers may be hidden.

A system may provide web site proprietors with web site user demographics information and is generally described in U.S. application Ser. No. 09/080946, "DEMOGRAPHIC INFORMATION GATHERING AND INCENTIVE AWARD SYSTEM AND METHOD" to Bistriceanu et al. and U.S. application Ser. No. 11/416593, "ROBUST SILO BASED SYSTEM ARCHITECTURE" to Bohannon, the entire disclosures of which are hereby incorporated by reference. Generally, the system may include users, web site proprietors, and an enterprise system hosting a central web site. The users may register with the central web site and may earn "points" for performing specific on- or off-line tasks in exchange for disclosing their demographic information during registration. On-line activity may be described in e-mails that are sent to the user by his consent during a registration process. For example, users may earn points by selecting hyperlinks embedded in e-mails The users may then redeem their earned points at participating proprietors for merchandise or services. Generally, the central web site manages the system by performing a number of tasks including: maintaining all user demographic information, tracking user point totals, and awarding points according to specific, proprietor-defined rules. Proprietors may market their products or services to specific users based on the provided demographic information.

Typically, users register with web-based services by a "double opt-in" process. Two interactions by the user are required to complete a double opt-in registration. First, the user must be solicited, for example, by an unsolicited e-mail or through another service to which he is a member and has given consent for solicitations. The solicitation will allow the user to submit required registration information to complete a first "co-registration" step. The user is considered "single opted in" after submitting the information requested from a solicitation. Upon receipt of the registration information, the service sends another e-mail to the user to confirm that the e-mail address given during the co-registration step is actually associated with the user. By responding to the confirmation, the user demonstrates their desire to be a member of the service and gives permission to the service to begin sending information to the user. Thus, only upon receipt of a user's registration information, either in response to a solicitation e-mail or from a registration website accessed by the user, and submission and receipt of a confirmation e-mail, will a web service user be fully registered. Because there are two steps a user must complete before registration in the double opt-in process, twice as many opportunities exist for the process to fail either through user inaction, user disinterest, or data errors.

SUMMARY

A method and system are herein disclosed for registering a member at a targeted web-based information management system using a reduced amount of member and system interaction to confirm and establish the member's contact information. Generally, the method may communicate permission to solicit a potential member to the information management system. In one embodiment, the member previously communicated permission to receive solicitations from other systems to another web-based information management system. The method may communicate the permission from another web-based system to the present system. The permission may include member identification and/or demographic data. The method may communicate a solicitation message from the system to the member, the solicitation message comprising at least a portion of the member identification data. The member may then communicate a confirmation message to the targeted web-based information management system, wherein the confirmation message is in reply to the solicitation message and includes the portion of the member identification data. Using the confirmation, the system may then match the portion of the member identification data from the confirmation message to the portion of the member identification data from the confirmation message.

DETAILED DESCRIPTION

Figure 1:
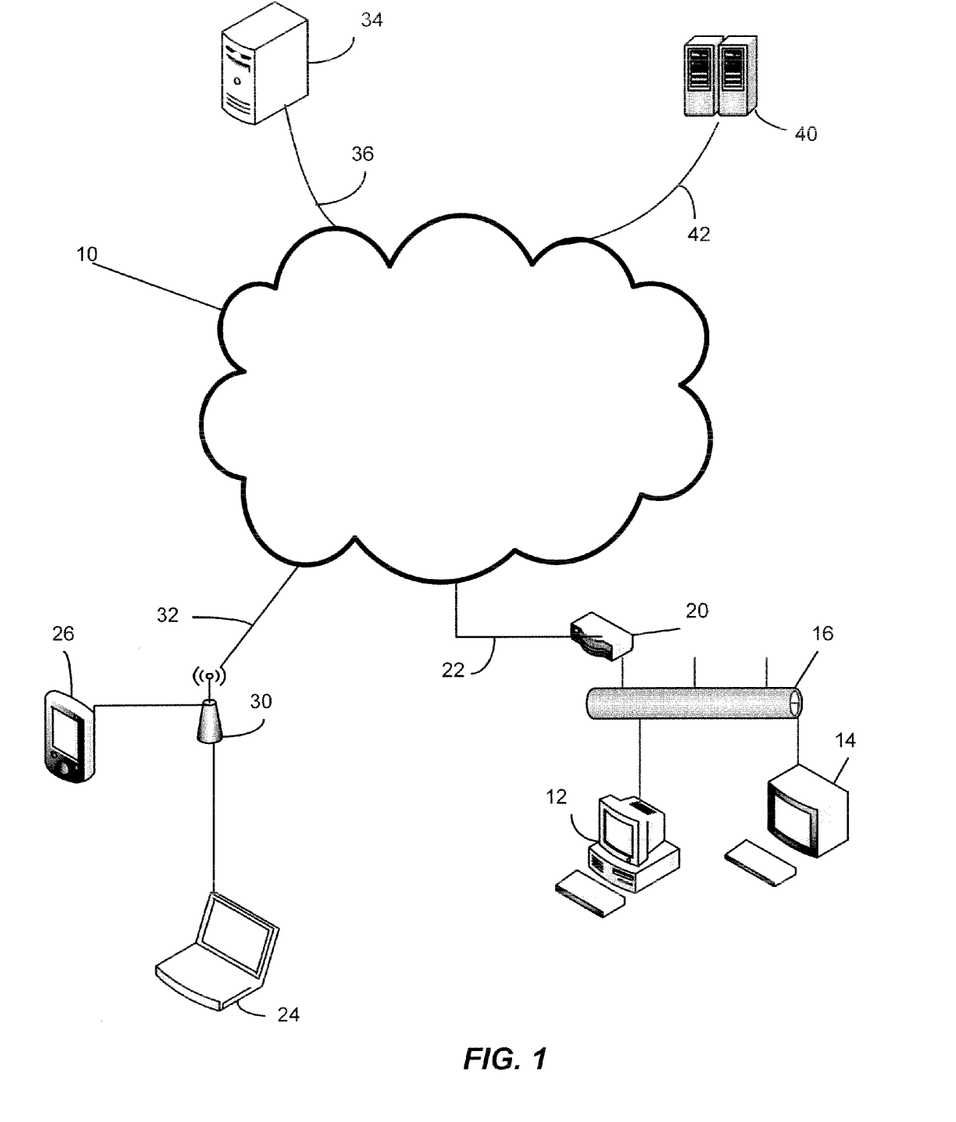
FIG. 1 is a diagram of one example of a network and network devices including a user access point and a web-based information management system.

FIG. 1 illustrates an example of a network typical of the World Wide Web. A network 10 may be a virtual private network (VPN), or any other network that allows one or more computers, communication devices, databases, etc., to be communicatively connected to each other. The network 10 may be connected to a PC 12 or a computer terminal 14 by any means able to communicate electronic signals. In one embodiment, the components may be connected to the network 10 via an Ethernet 16 and a router 20, or a land line 22. The network 10 may also be wirelessly connected to a laptop computer 24 and a personal data assistant 26 via a wireless communication station 30 and a wireless link 32. Similarly, a server 34 may be connected to the network 10 using a communication link 36. Also, an information management system 40 may be connected to the network 10 using another communication link 42. Where the network 10 includes the Internet, data communication may take place over the network 10 via an Internet communication protocol. In operation, the client PC 12 may view or request data from any other computing device connected to the network 10. Further, the PC 12 may send data to any other computing device connected to the network 10.

Figure 2:
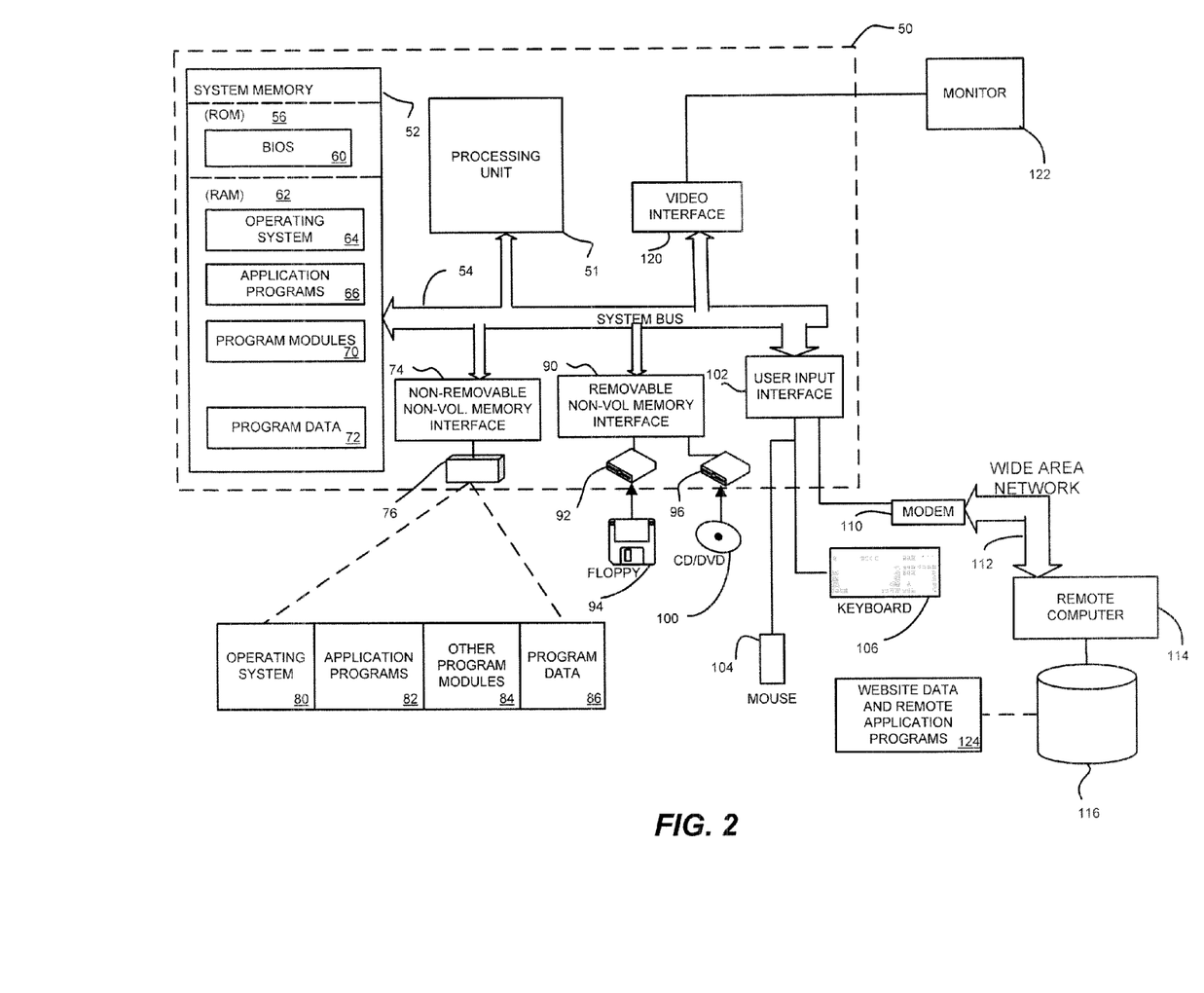
FIG. 2 is a diagram of one example of a general computing device that may operate in accordance with the claims.

FIG. 2 illustrates a typical computing device 50 that may be connected to the network 10 of FIG. 1 and participate in a distributed computing environment such as the World Wide Web and communicate with an information management system 40. FIG. 2 may also be an example of an appropriate computing system on which the claimed apparatus and claims may be implemented however, FIG. 2 is only one example of a suitable computing system and is not intended to limit the scope or function of any claim. The claims are operational with many other general or special purpose computing devices such as PCs 12, server computers 34, portable computing devices such as a laptop 24, consumer electronics 26, mainframe computers, or distributed computing environments that include any of the above or similar systems or devices.

With reference to FIG. 2, a system for implementing the steps of the claimed apparatus may include several general computing devices in the form of a computer 50. The computer 50 may include a processing unit, 51, a system memory, 52, and a system bus 54 that couples various system components including the system memory 52 to the processing unit 51. The system bus 54 may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

Computer 50 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 50. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. The system memory 52 may include storage media in the form of volatile and/or non-volatile memory such as ROM 56 and RAM 62. A basic input/output system 60 (BIOS), containing algorithms to transfer information between components within the computer 50, may be stored in ROM 56. Data or program modules that are immediately accessible or are presently in use by the processing unit 51 may be stored in RAM 62. Data normally stored in RAM while the computer 50 is in operation may include an operating system 64, application programs 66, program modules 70, and program data 72.

The system memory 52 may include storage media in the form of volatile and/or non-volatile memory such as ROM 56 and RAM 62. A basic input/output system 60 (BIOS), containing algorithms to transfer information between components within the computer 50, may be stored in ROM 56. Data or program modules that are immediately accessible or are presently in use by the processing unit 51 may be stored in RAM 62. Data normally stored in RAM while the computer 50 is in operation may include an operating system 64, application programs 66, program modules 70, and program data 72.

The computer 50 may also include other storage media such as a hard disk drive 76 that may read from or write to non-removable, non-volatile magnetic media, a magnetic disk drive 251 that reads from or writes to a removable, non-volatile magnetic disk 94, and an optical disk drive 96 that reads from or writes to a removable, nonvolatile optical disk 100. Other storage media that may be used includes magnetic tape cassettes, flash memory cards, digital versatile disks, digital video tape, solid state RAM, and solid state ROM. The hard disk drive 76 may be connected to the system bus 54 through a non-removable memory interface such as interface 74. A magnetic disk drive 92 and optical disk drive 96 may be connected to the system bus 54 by a removable memory interface, such as interface 90.

The disk drives 92, 96 transfer computer-readable instructions, data structures, program modules, and other data for the computer 50 to different storage media 94, 100 for storage. A hard disk drive 76 may store an operating system 64, application programs 66, other program modules 70, and program data 72. These components may be the same or different from operating system 64, application programs 66, other program modules 70 and program data 72. The components associated with the hard disk drive 76 may be different copies than those associated with RAM 62.

The user may interact with the computer 50 through input devices such as a keyboard 106 or a pointing device 104 (i.e., a mouse). A user input interface 102 may be coupled to the system bus 54 to allow the input devices to communicate with the processing unit 51. A display device such as a monitor 122 may also be connected to the system bus 54 via a video interface 120.

The computer 50 may operate in a networked environment using logical connections to one or more remote computers 114. The remote computer 114 may be a PC 12, a server 34, a router 20, or other common network node as illustrated in FIG. 1. The remote computer 114 typically includes many or all of the previously-described elements regarding the computer 50, even though only a memory storage device 116 is illustrated in FIG. 2. Logical connections between the computer 50 and one or more remote computers 114 may include a wide area network (WAN) 112. A typical WAN is the Internet. When used in a WAN, the computer 50 may include a modem 110 or other means for establishing communications over the WAN. The modem 110 may be connected to the system bus 54 via the user input interface 102, or other mechanism. In a networked environment, program modules depicted relative to the computer 50, may be stored in the remote memory storage device 116. By way of example, and not limitation, FIG. 2 illustrates website data and remote application programs 124 as residing on the memory device 116. As may be appreciated, other means of establishing a communications link between the computer 50 and the remote computer 114 may be used.

As previously described, the method and system may activate new members of an information management system 40 by requiring only a single e-mail to be sent to a potential new member rather than two. As used herein, a user or member may be any person, apparatus, method, or the like that employs a computing device 50 to access the system 40.

As used herein, "demographic information" may be broadly construed and may include any kind of member descriptive data, any activity associated with a member, or any transaction associated with a member. Demographic information may be gathered by the system 40 upon user registration in the form of a questionnaire designed to solicit various demographics data of interest to the proprietors. The questionnaire may be in the form of a website page, e-mail, or any other format able to collect demographics information from the user. Users may register in a variety of ways including direct registration at a central web site hosted by the information system 40, registration through web site proprietors, a web based "refer-a-friend" program, third-party direct mailing, or other partner relationships. A user may need only to register with the system once. The demographics information, to include but not limited to information gathered by questionnaire or records of any user action taken at the suggestion of or related to the system and a proprietor campaign, may be aggregated into a unique user profile. Once the user creates a profile, all future user activity within the system 40 may be uniquely associated with the user's profile. A user may participate in the system by using a network 10 and a PC 12.

Also, as used herein, the information management system may refer generally to the method or apparatus that coordinates user and system manager functions by collecting user demographic information, awarding redeemable points to the users, tracking points for the users or proprietors, aggregating statistical information concerning user activity and the demographic information, maintaining the proper function of all user and proprietor activity, providing statistical and demographic information to the proprietors, sending targeted e-mail to the users, and executing any other management or coordination functions. The targeted e-mails may contain hyperlinks that direct users to proprietor offers that may award or redeem points to a specific user account. The system may be a collection of devices, typically general purpose computing devices 50, servers, 34, and data stores connected to and in communication with a user PC 12 through a network 10.

Figure 3:
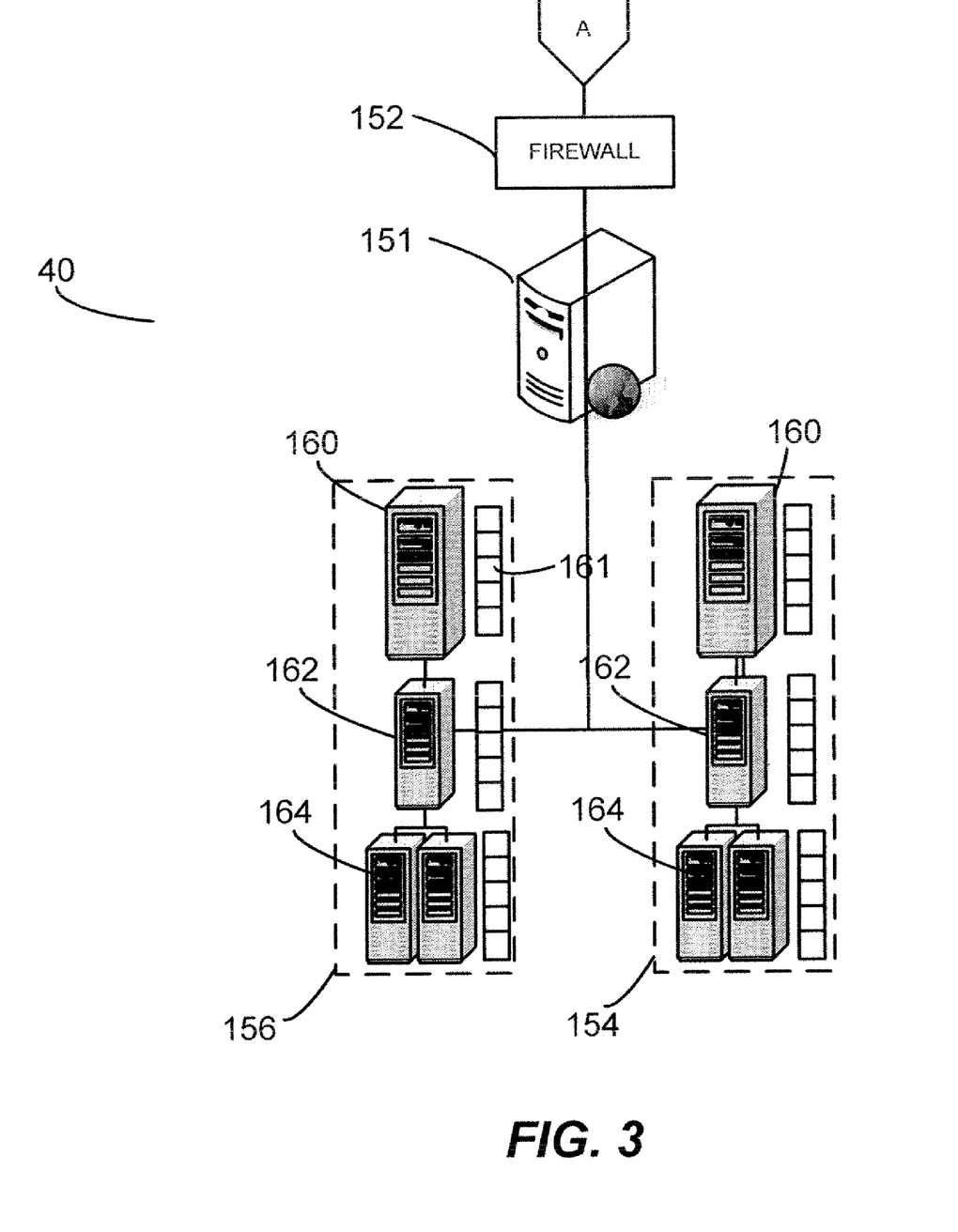
FIG. 3 is a diagram of one example of an information management system.

With reference to FIG. 3, the system 40 may include an architecture that is N-tier with a web server 151 in communication with a system firewall 152 through which a user may access a website hosted on the web server 151 by the system 40. The system firewall 152 may provide a secure, high-speed connection to a computer network such as the Internet as illustrated in FIG. 1. The web server 151 may face the users and communicate with a number of server groups or "silos" such as silo 154 and silo 156. A silo may be a conceptual collection of servers that work together through an application interface. Each silo may include, for example, an application server 160 that may execute a system application program 161.

With reference to FIG. 2 and FIG. 3, a system application program 161 running on the application server 160 may be an application program 66 or a remote application program 124 and may perform any coordination, transformation, or update process on the data entering or exiting the master data server 162. Further, a system application program 161 may execute on any general computing device 50 or any system 40 component. A system application program 161 running on the application server 160 may include, for example, any combination of an e-mail engine, a query engine, a validation engine, a crypto engine, an award engine, or a transaction engine.

Returning to FIG. 3, the application server 160 may communicate between the web server 151 and a master data server 162 to pass data from the web server 151 or to pass data generated by the system application programs 161 to the master data server 162 or any other system 40 element. The master data server 162 may include a portion of the total system 40 data, consisting of, for example, user demographic data, campaign data, and any other data used by the system 40. In turn, the master data server 162 may communicate with replication data servers 164. The replication data servers 164 may include a duplicate copy of the user profile data assigned to the silos 154, 156.

The system capacity is expanded by adding more silos 154, 156. The silos 154, 156 may also provide specialized functions within the system 300. For example, the silo 156 may be an administrative silo 156. The administrative silo 156 may be used by the system 40 to manage system information, campaign information, or any other information not related to the user profiles. The administrative silo 156 may also include a lookup table that may direct any data queries to the correct member silo 154. The administrative silo 156 may combine several different functions together, or it may be split apart into separate silos. For example, one administrative silo may contain campaign information while a separate administrative silo may contain a lookup table to direct any data queries to the correct member silo 154. Alternatively, there could be a third administrative silo which manages, for example, inventory information for redemptions. Thus, the administrative functions need not be confined to a single administrative silo. It should be noted that separating some functions into multiple administrative silos may increase the scalability of the system as a whole.

The member silo may hold the system 40 member information. The member information may include, for example, the user profile, demographics data, transactions, or point balances. As illustrated in FIG. 3, a system comprising one member silo 154 may hold approximately 100% of the total system 40 user information. Upon registration, a member's information may be stored in the member silo 154. The silo containing the member's registration data may be called the member's "home silo." Each member's information may be kept in the member's "home silo," and may remain in the home silo unless more member silos are added to the system 40.

A system for activating new members of an information management system 40 may include a variety of structures and components as generally described in relation to FIGS. 1, 2, and 3. Therefore, the system configurations described in relation to FIGS. 1, 2, and 3 may include any combination of elements described in relation to each figure.

Figure 4:
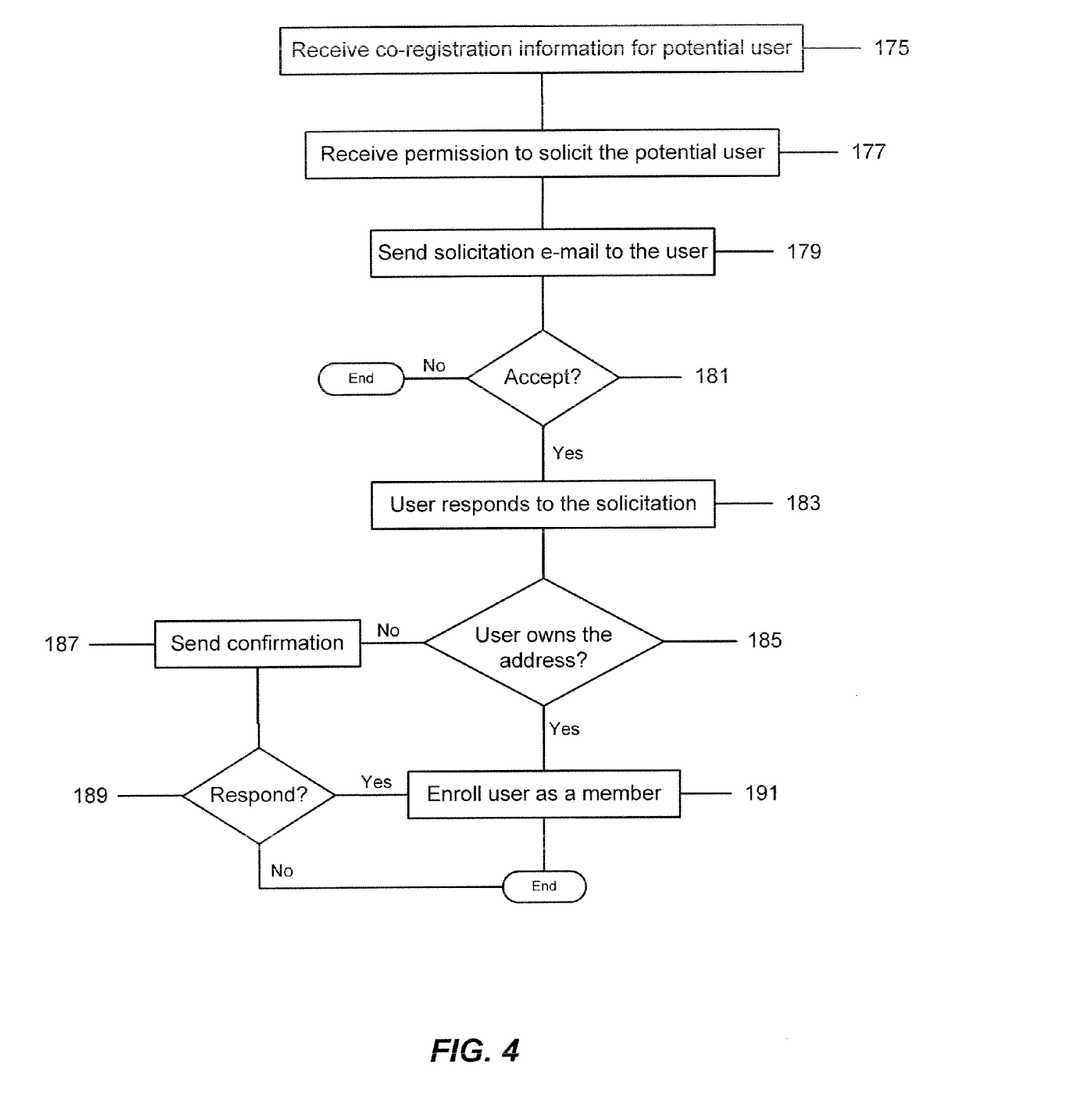
FIG. 4 is a flowchart describing a method of one example of activating new members of an information management system.

With reference to FIG. 4, a method and system for activating new members of an information management system may be described. At block 175, an information management system 40 may receive registration information related to a potential user. For example, the registration information may include user demographic information, an e-mail address, and/or any other information provided by a user during a previous registration. For example, a user may register and provide an e-mail address during any number of various transactions including a purchased product registration, an information website registration, a paper or electronic survey, or a membership registration. Of course, many other types of user registrations that include an e-mail address may also be possible. In one embodiment, the system 40 receives the information from another information management system, for example, a web-based system that maintains membership and demographic information related to many potential users. In another embodiment, the system 40 actively collects e-mail addresses from various online sources, for example, a batch collection of addresses. Additionally, the collected information may be compared against a "do not solicit" list to exclude information associated with members who have previously requested not to be solicited.

At block 177, the system 40 may receive permission to solicit the potential member. For example, the potential member may have provided the information discussed in relation to block 175 during a registration process with another information management system. During the registration with the other system, the potential user may have provided consent to the other system to allow the user's information to be shared with other entities and for the user to be solicited by other services. In one embodiment, another system provides the consent to the system 40 along with the information related to block 175. In a further embodiment, the system 40 receives the consent to solicit a user from an information management warehouse wherein the warehouse collects many sets of user information to distribute to other information management systems such as the system 40.

At block 179, the system 40 may send a solicitation to the user. For example, the solicitation may be sent to the user via e-mail using an address provided by the user during the previous registration described in relation to block 175. The user may also receive the solicitation from a number of other or disparate sources including, for example, the system 40, a data warehouse or other service that may act on behalf of the system 40, and/or any other usable data source. The solicitation may include a number of additional questions to be answered by the user to provide more or different demographic or personal information to the system 40. In one embodiment, the solicitation includes further questions related to demographic or other information that is useful to the system 40. From a system primarily related to demographic information gathering and marketing research, the solicitation may include additional questions directed to the user concerning products the user might use. In another embodiment, the solicitation includes questions related to the demographic information provided to the system in relation to block 175.

At block 181, the user may accept or decline the solicitation. If the user declines the solicitation, by, for example, deleting or otherwise discarding the solicitation, the method ends. If the system 40 does not receive a response after a period of time, the system 40 may send another solicitation to the user. The user may accept the solicitation, at block 183, by responding. In one embodiment, where the solicitation is an e-mail, the user responds to the solicitation by selecting a redirection message or hyperlink embedded in the e-mail. The hyperlink may include information that may be used by the system 40 to identify the potential user's e-mail address or other identifying information. For example, the hyperlink may include encoded user identification information.

The encoded information may be a hash of the potential user's e-mail address that, when received by the system 40, is matched to the potential user's records received in relation to block 175. The encoded information may also include a location of the potential user's record, for example, a "silo" 154, 156 identifier, to allow the system 40 to directly modify the information received and stored in connection to block 175 without first performing a lookup operation. For example, where the system 40 includes multiple data repositories such as silos 154, 156, an encoded locator may allow the system to quickly modify the record at the proper location. The hyperlink may also include an encoded string or any other encoded information.

In a further embodiment, the encoded information may be a unique value that may not easily be forged. The unique value may then be used to look up information in the system 40. For example, the unique value may be a large random number or string that is unrelated to any direct encoding of the user's email address or other user information. As a security measure, the unique value may be sufficiently unique that a malicious attacker could not simply modify the value within the hyperlink to forge another member's identification. In a further embodiment, the unique value may be a member of a large and sparse set of identifiers. The large set would make it impractical for any attacker to discover other actual identifiers by merely changing the unique value embedded in the hyperlink. For example, a random number range of 32 bits (4 billion possible values) may be sufficiently large to deter attackers in a system that generally sends solicitations at a rate of less than 1 million per month. Of course, other sizes and types of random sets may be used that are sufficiently large in relation to a number of registered users or a number of solicitations sent by the system 40. With a large number of possible unique values, an attacker may be forced to try millions of values to discover another registered value. The system 40 may also be configured with a monitoring function to discover the attacker's source internet protocol (IP) address as the attacker exposes their voluminous activity. The system may then block the IP address or otherwise identify the IP for anti-fraud purposes.

In a still further embodiment, the registration data or a portion of the registration data is included in the solicitation email. For example, at least one practically unforgeable piece of data, such as a random number or string or encrypted value based on a secret key, may be included in the solicitation and presented back to the system 40 upon registration. In this case, the system may not have previously stored the registration data and it may be sufficient to verify that the unforgeable piece of data returned to the system 40 in response to the solicitation is intact and corresponds to the previously-provided data. In this way, the system 40 may not store the registration data and this may reduce the storage space required by the system 40 for large numbers of potential users. Furthermore, the unforgeable piece of data may not be unique to the solicited user and it may be sufficient that a user would not practically be able to determine what the unforgeable data must be in order to convince the system 40 that the remainder of the previously-provided registration data (such as an e-mail address) corresponds to that unforgeable data. For example, an encrypted or hashed version of the registration data, or a portion of the registration data, may be included in a solicitation e-mail that is based on a secret that only the system 40 knows.

In a still further embodiment, the user provides additional information along with his response. For example, the additional information may be provided in response to questions included in the e-mail. Also, selecting the response hyperlink may redirect the user to a website that requests additional information to be sent to the system 40. Another embodiment may provide the user with the option of including additional information in a response or returning the response without sending more data.

At block 185, the system 40 may con firm the user's address. For example, from information related to block 175, the system 40 may receive an e-mail address or other information generated as a result of responding to the solicitation associated with block 183. The potential user's response at block 183 may serve as a confirmation that the address provided to the system 40 at block 175 correctly belongs to the potential user. Further, the response may also confirm that the potential user's e-mail address does not contain a typographical or other error. In one embodiment, the solicitation may be in the form of an e-mail message and may include a hyperlink that, upon selection, may send a response to the system 40 that confirms the potential user's e-mail address. In another embodiment, if the user provides additional information in response to the solicitation, sending the additional information may also confirm the potential user's e-mail address.

If, at block 185, the system 40 receives a response that does not confirm the potential user's address, at block 187, the system 40 may send a confirmation e-mail to the new address. For example, at block 183, the user may have modified the registration information to include a different e-mail address than the one provided at block 175. Also, a potential user may have forwarded a solicitation originally sent by the system 40 to another e-mail address. In either situation, the user may accept the solicitation and send a response that does not include the e-mail address as originally provided and, therefore, does not confirm the original e-mail address and user registration to the system 40. If, at block 189, the user responds to the confirmation message, at block 191, the system 40 may enroll the user as a member. If the user does not respond, the method may terminate.

If, at block 185, the system 40 receives a response that confirms the potential user's address after receiving the potential user's consent to receive the solicitation at block 177, the system may, at block 191, enroll the user as a member. Thus, the potential user may be enrolled as a member of the system by responding to a single e-mail rather than two.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A method for registering a new member of a web-based information management system that includes a plurality of registered members, the method comprising:

receiving permission to solicit the new member from a third-party source at the web-based information management system, the permission including new member identification data, the new member identification data including a new member email address;

initiating a single interaction from the web-based information management system to the new member, the single interaction consisting of:

a) communicating a solicitation message from the web-based information management system to the new member, the solicitation message including a unique identifier corresponding to at least the new member email address of the new member identification data, and b) receiving a confirmation message at the web-based information management system, the confirmation message in reply to the solicitation message and including the unique identifier corresponding to at least the new member email address of the new member identification data;

matching the unique identifier corresponding to at least the new member email address of the new member identification data from the solicitation message to the unique identifier corresponding to at least the new member email address of the new member identification data from the confirmation message; and when the unique identifier corresponding to at least the new member email address of the new member identification data from the solicitation message matches the unique identifier corresponding to at least the new member email address of the new member identification data from the confirmation message, confirming the new member's ownership of the new member email address using the single interaction.

2. The method of claim 1, further comprising storing the permission to solicit the new member at the third-party source.

3. The method of claim 1, wherein the new member identification data further comprises a street address, a name, an address, a birth date, or new member demographic information.

4. The method of claim 1, wherein receiving the confirmation message at the web-based information management system comprises:

receiving a redirection message from the solicitation message, the redirection message including the portion of the new member identification data; and receiving the portion of the new member identification data at the web-based information management system.

5. The method of claim 1, further comprising modifying the portion of the new member identification data included in the solicitation message before communicating the solicitation message, wherein the unique identifier cannot practically be forged.

6. The method of claim 1, wherein the unique identifier further corresponds to at least one of a string, a number, an encrypted e-mail address associated with the new member, new member demographic information, a reference to a portion of the targeted web-based information management system, or a record locator.

7. The method of claim 1, wherein, when the new member identification data is inoperative, initiating a second interaction from the web-based information management system to the new member, the second interaction consisting of:

communicating a confirmation message to the new member from the web-based information management system; and communicating permission to register the new member in reply to the confirmation message.

8. The method of claim 1, further comprising registering the new member at the web-based information management system when at least the new member email address of the new member identification data from the solicitation message is identical to at least the new member email address of the new member identification data from the confirmation message.

9. The method of claim 1, further comprising, when the new member email address of the new member identification data from the solicitation message does not match the new member email address of the new member identification data from the confirmation message, initiating a second interaction from the web-based information management system to the new member, the second interaction consisting of:
communicating a confirmation message to the new member from the web-based information management system; and
communicating permission to register the new member in reply to the confirmation message.

10. The method of claim 1, wherein the unique identifier corresponding to the portion of the new member identification data includes encoded new member identification data.

11. The method of claim 10, wherein the encoded new member identification data includes one or more of a hash of the new member identification data, a location of the new member identification data within the web-based information management system, an encoded string, or an encoded number.

12. The method of claim 1, wherein the unique identifier is a member of a large set of identifiers, the large set of identifiers including: 1) a first plurality of identifiers each corresponding to a different member identification data, and 2) a second plurality of identifiers none of which correspond to any member identification data,
wherein a number of the second plurality of identifiers outnumbers a number of the first plurality of identifiers such that modification of the unique identifier to match any of the first plurality of identifiers is statistically improbable.

13. The method of claim 12 wherein the second plurality of identifiers includes one or more of a large set of random numbers or a large set of strings.

14. The method of claim 12 wherein the second plurality of identifiers is larger than the plurality of registered members by a factor of at least one to four thousand.

15. A computer-readable storage medium storing computer-executable modules for execution on a processor of an information management system, the modules comprising:
receiving a permission to solicit a new member from a first web-based information management system at a second web-based information management system, the permission including new member identification data, the new member identification data including a new member email address;
initiating a single interaction from the second web-based information management system to the new member, the single interaction consisting of:
a) communicating a solicitation message from the second web-based information management system to the new member for confirmation by the new member, the solicitation message including a unique identifier corresponding to at least the new member email address of the new member identification data, and
b) receiving a redirection message at the second web-based information management system in response to the solicitation message communicated to the new member, the redirection message including the unique identifier corresponding to at least the new member email address of the new member identification data;
matching the unique identifier corresponding to at least the new member email address of a new member identification data from the solicitation message to the unique identifier corresponding to at least the new member email address of the new member identification data from the redirection message; and
when the unique identifier corresponding to at least the new member email address of the new member identification data from the solicitation message matches the unique identifier corresponding to at least the new member email address of the new member identification data from the redirection message, registering the new member at the second web-based information management system using the single interaction.

16. The computer-readable storage medium of claim 15, wherein registering the new member at the second web-based information management system includes communicating the new member identification data from the new member to the second web-based information management system.

17. The computer-readable storage medium of claim 15, wherein the new member identification data further comprises at least one of a street address, a name, an address, a birth date, or new member demographic information.

18. The computer-readable storage medium of claim 15, wherein the unique identifier includes one or more of an encrypted string, a number, an encrypted e-mail address associated with the new member, new member demographic information, a reference to a portion of the second web-based information management system, or a record locator.

19. The computer-readable storage medium of claim 15, further comprising, when the portion of the new member identification data from the solicitation message does not match the portion of the new member identification data from the confirmation message:
communicating a confirmation message to the new member from the second targeted web-based information management system; and
if the new member confirms the confirmation message, receiving permission to register the new member in reply to the confirmation message.

20. The computer readable storage medium of claim 15, wherein the unique identifier is a member of a large set of identifiers, the large set of identifiers including 1) a first plurality of identifiers each corresponding to a different member identification data, and 2) a second plurality of identifiers none of which correspond to any member identification data,
wherein a number of the second plurality of identifiers outnumbers a number of the first plurality of identifiers such that modification of the unique identifier to match any of the first plurality of identifiers is statistically improbable.

21. The computer-readable storage medium of claim 20, wherein the large set of identifiers includes one or more of a large set of random numbers or a large set of strings.

22. The computer-readable storage medium of claim 20, wherein the second plurality of identifiers is larger than a plurality of registered members by a factor of at least one to four thousand.

23. A computer system comprising a processor for executing computer executable code, a memory for storing data and computer executable code and an input/output circuit, the processor physically configured to execute computer executable code for:

receiving permission to solicit a new member from a first web server at a targeted web-based information management system, the permission including new member identification data, the targeted web-based information management system residing at a second web server, the new member identification data including a new member email address;

initiating a single interaction from the targeted web-based information management system to the new member, the single interaction consisting of:

a) communicating a solicitation message from the targeted web-based information management system to the new member for confirmation by the new member, the solicitation message including a unique identifier corresponding to at least the new member email address of the new member identification data, and         b) receiving a redirection message at the targeted web-based information management system in response to the solicitation message, the redirection message including the unique identifier corresponding to at least the new member email address of the new member identification data;

matching the unique identifier corresponding to at least the new member email address of the new member identification data from the solicitation message to the unique identifier corresponding to at least the new member email address of the new member identification data from the redirection message;

using the unique identifier from the redirection message to match the new portion of new member identification data to the portion of new member identification data from the permission; and     when the unique identifier corresponding to at least the new member email address of the new member identification data from the solicitation message matches the unique identifier corresponding to at least the new member email address of the new member identification data from the redirection message, registering the new member at the targeted web-based information management system using the single interaction.

24. The computer system of claim 23, wherein the new member identification data comprises one or more of an e-mail address, a street address, a name, a memory address, a birth date, or member demographic information.

25. The computer system of claim 23, wherein the unique identifier includes one or more of an encrypted string, a number, an encrypted e-mail address associated with the new member, new member demographic information, a reference to a portion of the targeted web-based information management system, or a record locator.

26. The computer system of claim 23, further comprising, if the unique identifier corresponding to at least the new member email address of the new member identification data from the solicitation message does not match the unique identifier corresponding to at least the new member email address of the new member identification data from the redirection message:

communicating a confirmation message to the new member from the first web server; and     when the new member confirms the confirmation message, receiving permission to register the new member in reply to the confirmation message.

27. The computer system of claim 23, wherein the unique identifier is a member of a large set of identifiers, the large set of identifiers including 1) a first plurality of identifiers each corresponding to a different member identification data, and 2) a second plurality of identifiers none of which correspond to any member identification data,     wherein a number of the second plurality of identifiers outnumbers a number of the first plurality of identifiers such that modification of the unique identifier to match any of the first plurality of identifiers is statistically improbable.

28. The computer system of claim 27, wherein the second plurality of identifiers is larger than a plurality of registered members by a factor of at least one to four thousand.

29. The computer system of claim 27, wherein the large set of identifiers includes one or more of a large set of random numbers or a large set of strings.

* * * * *